United States Patent [19]

Kusano

[11] Patent Number: 5,179,592
[45] Date of Patent: Jan. 12, 1993

[54] DATA SCRAMBLER AND DESCRAMBLER CAPABLE OF PREVENTING CONTINUOUS BIT ZEROS OR ONES

[75] Inventor: Toshihiko Kusano, Tokyo, Japan

[73] Assignee: NEC Corporation, Tokyo, Japan

[21] Appl. No.: 785,204

[22] Filed: Nov. 1, 1991

Related U.S. Application Data

[63] Continuation of Ser. No. 415,683, Oct. 2, 1989, abandoned.

[30] Foreign Application Priority Data

Sep. 30, 1988 [JP] Japan ............................... 63-244449
Dec. 23, 1988 [JP] Japan ............................... 63-327420

[51] Int. Cl.$^5$ ............................................. H04K 1/00
[52] U.S. Cl. ........................................ 380/28; 380/2; 380/42
[58] Field of Search .................. 380/2, 28, 36, 37, 42, 380/48, 49, 50; 381/29–35

[56] References Cited

U.S. PATENT DOCUMENTS

| | | | |
|---|---|---|---|
| 4,109,856 | 8/1978 | Van Beveren et al. | 380/48 X |
| 4,519,083 | 5/1985 | Hanson | 380/40 X |
| 4,802,220 | 1/1989 | Marker, Jr. | 380/49 |

Primary Examiner—Tod R. Swann
Attorney, Agent, or Firm—Sughrue, Mion, Zinn, Macpeak & Seas

[57] ABSTRACT

A data scrambler, which transmits a data sequence, includes circuitry to suppress consecutive occurrences of a predetermined number of data sequence bits having the same value. The number of consecutive occurrences of bits having the same value are counted. When the number of consecutive occurrences of bits having the same value reaches a predetermined number, at least one of the bits of the transmitted data sequence is inverted. Complementary circuitry is included in a data descrambler so that the bits that were inverted by the data scrambler can be re-inverted to their original value by the descrambler.

10 Claims, 4 Drawing Sheets

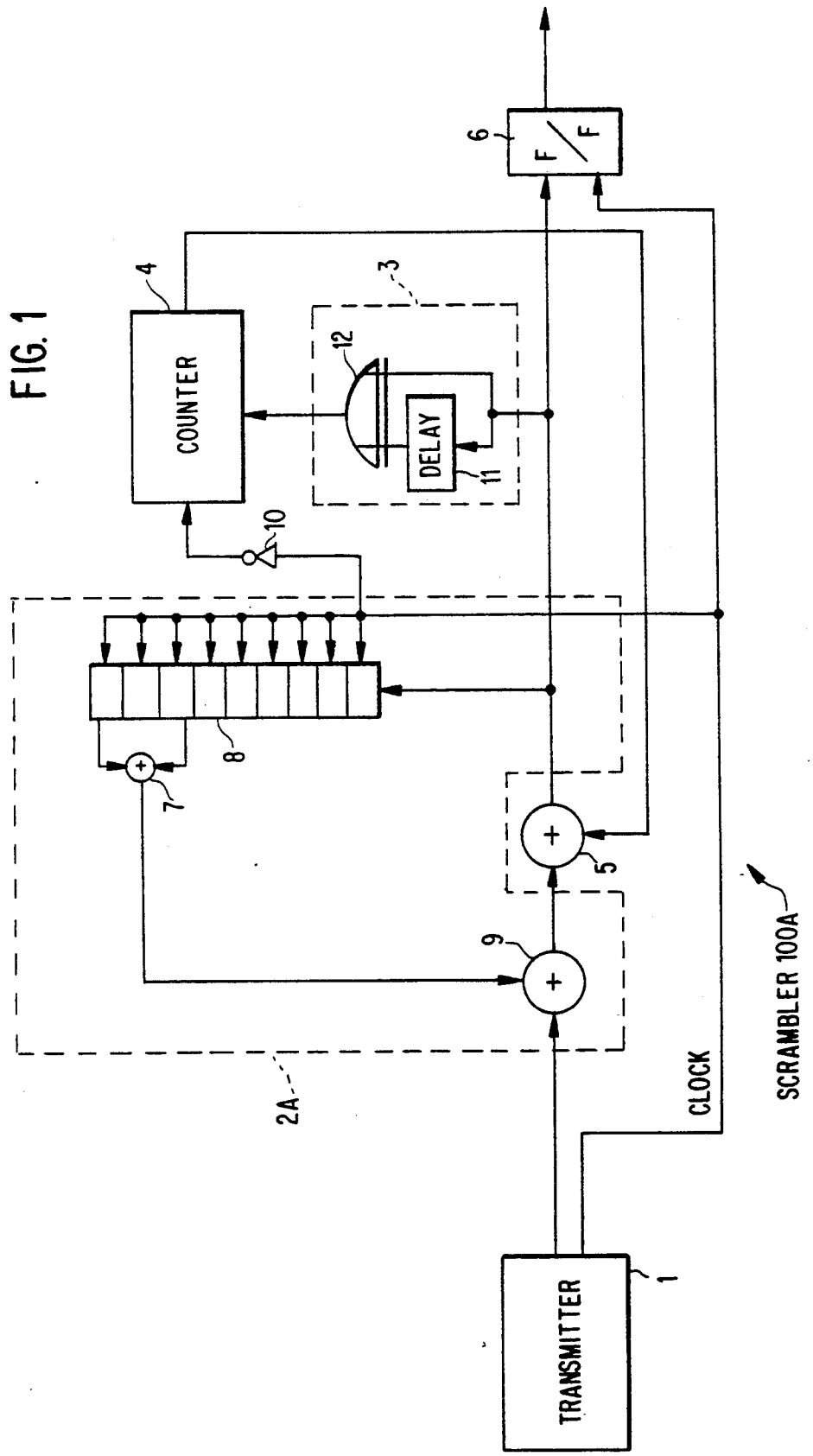

DATA SCRAMBLER AND DESCRAMBLER CAPABLE OF PREVENTING CONTINUOUS BIT ZEROS OR ONES

This is a continuation of application Ser. No. 07/415,683 filed Oct. 2, 1989 now abandoned.

BACKGROUND OF THE INVENTION

The present invention relates to a data scrambler for scrambling and transmitting a transmit data bit sequence. The invention also relates to a data descrambler for use in combination with a data scrambler.

In a data transmission system, if bits of the same symbol (bit zeros or ones) come out consecutively in a transmit data bit sequence, no timing signals can be extracted on the receive side from the transmit data. By the prior art, therefore, the transmit data bit sequence is scrambled with a self-timing scrambler to prevent the consecutive appearance of the same symbols in the bit sequence on the transmission path.

The conventional data scrambler referred to above involves the problem that, when starting the transmission of data for instance, the same symbols will consecutively come out after scrambling if the bit sequence in the register of the scrambler is wholly the same as that to be inputted to the scrambler.

SUMMARY OF THE INVENTION

An object of the present invention is to provide a data scrambler which is cleared of this disadvantage and is capable of suppressing any consecutive appearance of the same symbols that may occur in scrambled transmit data.

A data scrambler according to the invention has a scrambling circuit for generating a scrambled bit sequence by scrambling a transmit data bit sequence. A monitor circuit generates a detection signal by detecting the presence of any two consecutive same symbols in the scrambled bit sequence. In response to this detection signal, a counter counts clock pulses and, upon reaching a predetermined count, generates a control signal to suppress consecutive same symbols. The counter is reset in the absence of the detection signal. The control signal is used for controlling an inverting circuit for inverting the scrambled bit sequence. The inverting circuit may consist, for instance, of an exclusive OR gate having one terminal which is supplied with a scrambled bit sequence and another terminal which is supplied with the control signal. Another example of the inverting circuit may be realized by composing a predetermined register unit of a shift register, constituting the scrambling circuit, of a S-R flip-flop.

A data descrambler according to the invention includes a descrambling circuit, having a shift register comprising a plurality of register units, for generating a descrambled bit sequence by descrambling a scrambled bit sequence. A first counter counts a first predetermined number of consecutive bit zeros in the scrambled bit sequence to produce a first control signal. A second counter counts a second predetermined number of consecutive bit ones in the scrambled bit sequence to produce a second control signal. An inverter circuit is responsive to the first and second control signals to invert the content of a predetermined one among the plurality of register units in the shift register.

BRIEF DESCRIPTION OF THE DRAWINGS

The above other objects, features and advantages of the present invention will become apparent from the following detailed description when taken with the accompanying drawings in which:

FIG. 1 is a block diagram illustrating a first preferred embodiment of the invention;

DETAILED DESCRIPTION OF THE PREFERRED EMBODIMENTS

Figure 2A:
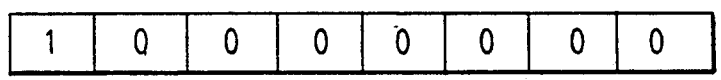
FIG. 2(a)-(H) is a timing chart for explaining the operation of the circuit of FIG. 1.

A first preferred embodiment of the present invention is shown in FIG. 1 in the form of a block diagram.

Referring to FIG. 1, a data scrambler 100A has a scrambling circuit 2A for generating a scrambled bit sequence by scrambling a transmit data bit sequence from a transmitter 1, and a monitor circuit 3 for detecting two consecutive bits from the scrambled bit sequence to be of different symbols. The scrambler 100A further is equipped with an inverter 10 for generating shifted clock pulses by shifting transmit clock pulses by a ½ bit each, a counter 4 for counting these shifted clock pulses up to n (1 being an integer not smaller than 2), and a bit inverter circuit 5 for forcibly inverting the transmit data bit sequence with the output of the counter 4. The scrambling circuit 2A, as is well known to those skilled in the art, consists of exclusive OR circuits (EXOR's) 7 and 9 and a shift register 8. The monitor 3 comprises a 1-bit delay 11 for generating a shifted bit sequence by shifting the scrambled bit sequence by 1 bit, and an EXOR circuit 12 for detecting identity between the scrambled bit sequence and the shifted bit sequence.

Now will be described the operation of the scrambler 100A with reference to FIGS. 2A to 2H, it being supposed that consecutive bits of the same symbol are zeros and their number is 6.

Figure 2B:
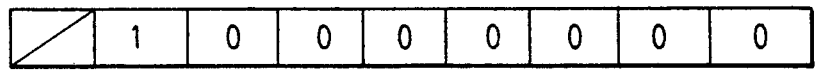
Figure 2C:
Figure 2D:
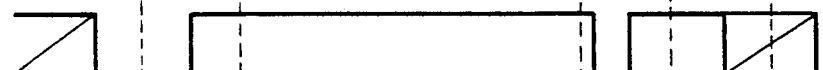
Figure 2E:
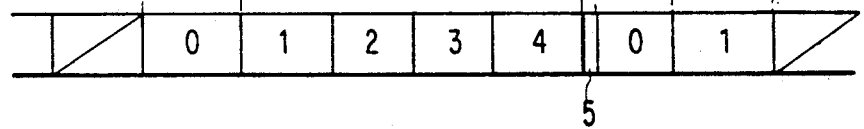
Figure 2F:
Figure 2G:
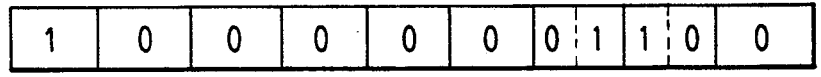
Figure 2H:
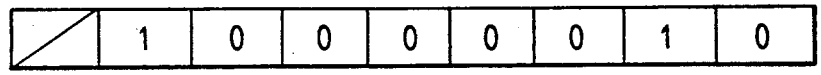

The transmit bit sequence from the transmitter 1 is converted into the scrambled bit sequence (FIG. 2A) in the scrambling circuit 2A. The monitor 3 generates a reset signal (FIG. 2D) for resetting the counter 4 in accordance with the scrambled bit sequence (FIG. 2A) and the 1-bit-shifted sequence (FIG. 2B). The counter 4 comprises a mod-5 counter which is reset back to the initial state after five counts, and generates a count up signal. That is, when the counter 4 counts up to 5 (FIG. 2E) in response to the ½-bit-shifted clock pulses (FIG. 2C), it sends a control signal (FIG. 2F) to the inverter circuit 5. This control signal indicates the detection of six consecutive "0" bits in the scrambled bit sequence (FIG. 2A) because the reset signal from the monitor 3 appears when consecutive bits of the scrambled bit sequence are different from each other. In response to the control signal, the inverter circuit 5 inverts the sixth bit of the scrambled sequence to "1" (FIG. 2G). This inverted bit is latched by a flip-flop (F/F) 6, and transmitted as the transmit data bit sequence (FIG. 2H). Incidentally, whereas "1" and "0" are simultaneously present in one time slot of the output of the EXOR 5 in FIG. 2G, a transmit in which one bit is allocated for each time slot, shown in FIG. 2H, is obtained by retiming with the F/F 6.

As the seven consecutive zero bits are necessary to detect the six consecutive zero bits in this preferred embodiment and the transmitted bit sequence includes only five consecutive zero bits, the original transmit bit sequence from the transmitter 1 cannot be restored from the transmitted bit sequence on the receive side. For this reason, the descrambler provided on the receive side is a conventional descrambler having no consecutive symbol detecting circuit like the scrambler hereunder.

Figure 3:
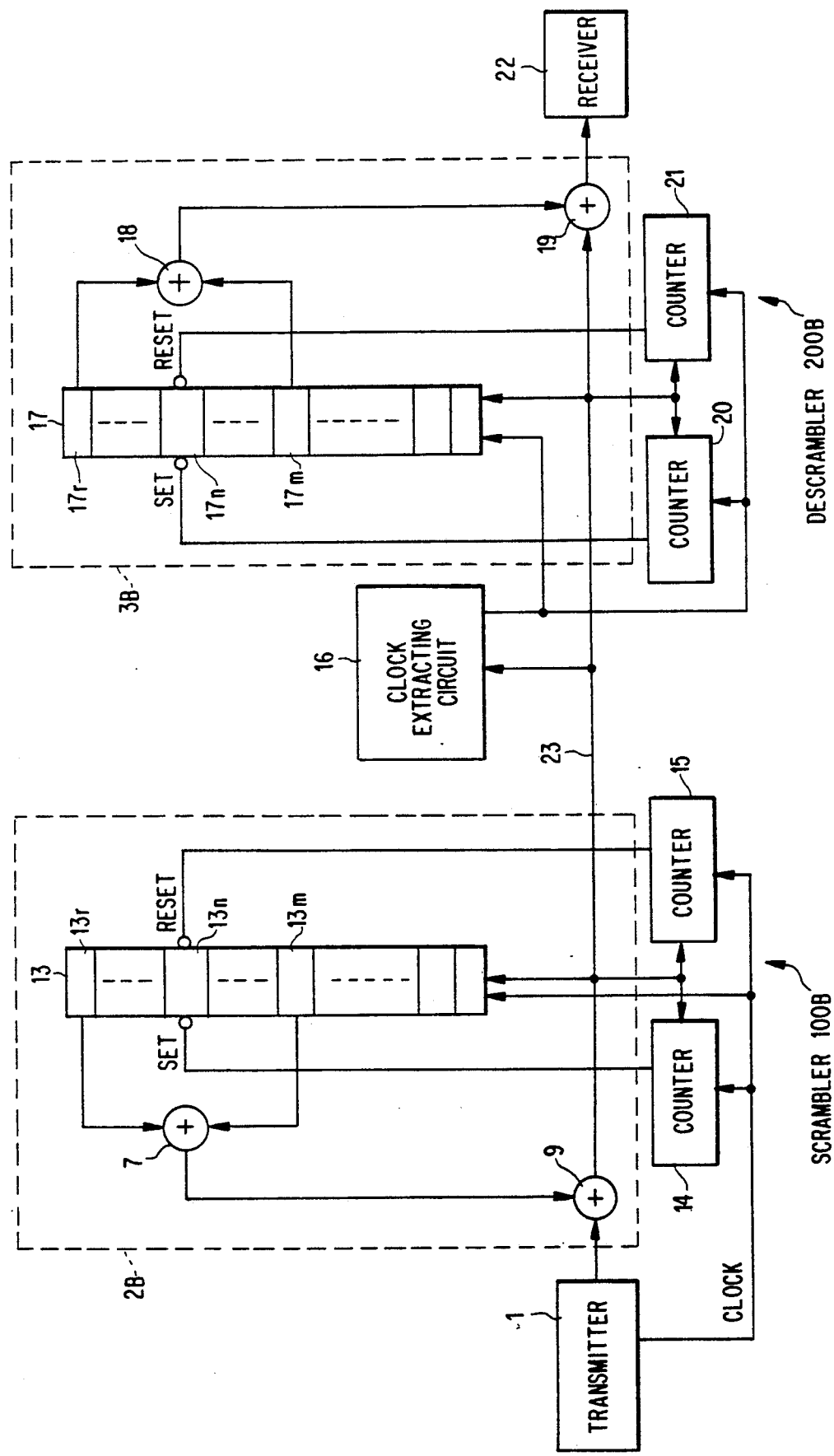
FIGS. 3 and 4 are block diagrams respectively illustrating second and third preferred embodiments of the invention.

FIG. 3 is a block diagram illustrating a second preferred embodiment of the present invention, in which a descrambler is shown in combination with a scrambler. In the figure, a scrambler 100B comprises a scrambling circuit 2B for scrambling a data bit sequence from a transmitter 1 and supplying the scrambled bit sequence to a transmission path 23, and counters 14 and 15 for detecting the consecutive appearances of "0" bits and "1" bits in the scrambled bit sequence. This counter 14 (15) can be composed of a counter reset by a "1" ("0") bit and counting "0" ("1") bits. Meanwhile, a descrambler 200B is provided with a clock pulse extracting circuit 16 for extracting clock pulses for use in the descrambler from the scrambled bit sequence transmitted via the transmission path 23, a descrambling circuit 3B for generating a descrambled bit sequence by descrambling the scrambled bit sequence, and counters 20 and 21 for respectively detecting the consecutive appearances of "0" bits and "1" bits in the descrambled bit sequence.

The scrambling circuit 2B is equipped with exclusive OR circuits (EXOR's) 7 and 9 and a shift register 13. The descrambling circuit 3B, like the scrambling circuit 2B, is equipped with EXOR's 18 and 19 and a shift register 17. Each of these shift registers 13 and 17 consists of r stages of D-F/F's, of which an n-th stage has a set terminal and a reset terminal.

Now will be described the preferred embodiment illustrated in FIG. 3. In the scrambling circuit 2B, the EXOR 9 performs the exclusive OR operation of a bit sequence from the transmitter 1 and the result of operation from the EXOR 7, and outputs its result as the scrambled bit sequence. The counter 14, reset by a "1" bit in the scrambled bit sequence, monitors the appearance of m consecutive "0" bits in the scrambled bit sequence. Thus the counter 14, upon counting up m consecutive "0" bits in the scrambled bit sequence, supplies a control signal to a register unit 13n of the shift register 13. The content of this shift register unit 13n is set to "1" when the control signal from the counter 14 is input to the SET terminal. The "1" in the shift register unit 13n is shifted on until it reaches a shift register unit 13r to supply "1" to one of the input terminals of the EXOR 7. As "0" is stored at this time in a shift register unit 13m because of the consecutive inputting of "0" bits, "0" is supplied to the other input terminal of the EXOR 7. The EXOR 7 performs the exclusive OR operation of the "0" bit in the shift register unit 13m and the "1" bit in the shift register unit 13r, and supplies the resultant "1" bit to the EXOR 9. The EXOR 9 calculates the exclusive OR of this "1" bit and the "0" bit in the input bit sequence, and outputs the resultant "1" bit as a bit of the scrambled bit sequence. As a result, the "1" bit is inserted into the scrambled bit sequence to prevent the consecutive appearance of "0" bits.

As the scrambled bit sequence is supplied from the transmission path 23, the descrambling circuit 3B descrambles the scrambled bit sequence, and obtains the descrambled bit sequence as the original bit sequence.

The counter 20, upon counting the consecutive appearance of m "0" bits in the descrambled bit sequence, sets a shift register unit 17n in the shift register 17 to "1". The "1" bit in the shift register unit 17n is shifted on until it reaches a shift register 17r. The EXOR 18 calculates the exclusive OR of the "0" bit in a shift register unit 17m and the "1" bit in the shift register unit 17r, and supplies the resultant "1" bit to the EXOR 19. The EXOR 19 calculates the exclusive OR of the "1" bit resulting from the foregoing calculation and the scrambled bit sequence to obtain the descrambled bit sequence, which is supplied to a receiver 22.

While "0" bits were consecutive in the foregoing example, if "1" bits are generated consecutively in the bit sequence from the transmitter 1 and the shift register 13 takes the same symbol, the scrambled bit sequence will comprise consecutive "1" bits. This consecutive appearance of "1" bits can also be prevented in a similar manner. If "1" bits are consecutive, the counter 15, instead of the counter 14, as it counts m consecutive "1" bits, will supply the control signal to the shift register unit 13n of the shift register 13. The shift register unit 13n, upon inputting of the control signal from the counter 15 to the RESET terminal, resets its content to "0". The "0" bit is shifted on until it reaches the shift register 13r to supply a "0" bit to one of the terminals of the EXOR 7. As "1" is stored in the register unit 13m as a result of the consecutive entries of "1", a "1" bit is supplied to the other terminal of the EXOR 7, which supplies a "1" bit to the EXOR 9 as the exclusive OR of these "1" and "0" bits. The EXOR 9 calculates the exclusive OR of this "1" bit and a "1" bit in the input bit sequence to turn the input bit sequence to "0".

As the descrambler 3B operates in this case in the same way as in the consecutive appearance of "0" bits, this operation will not be described here.

Figure 4:
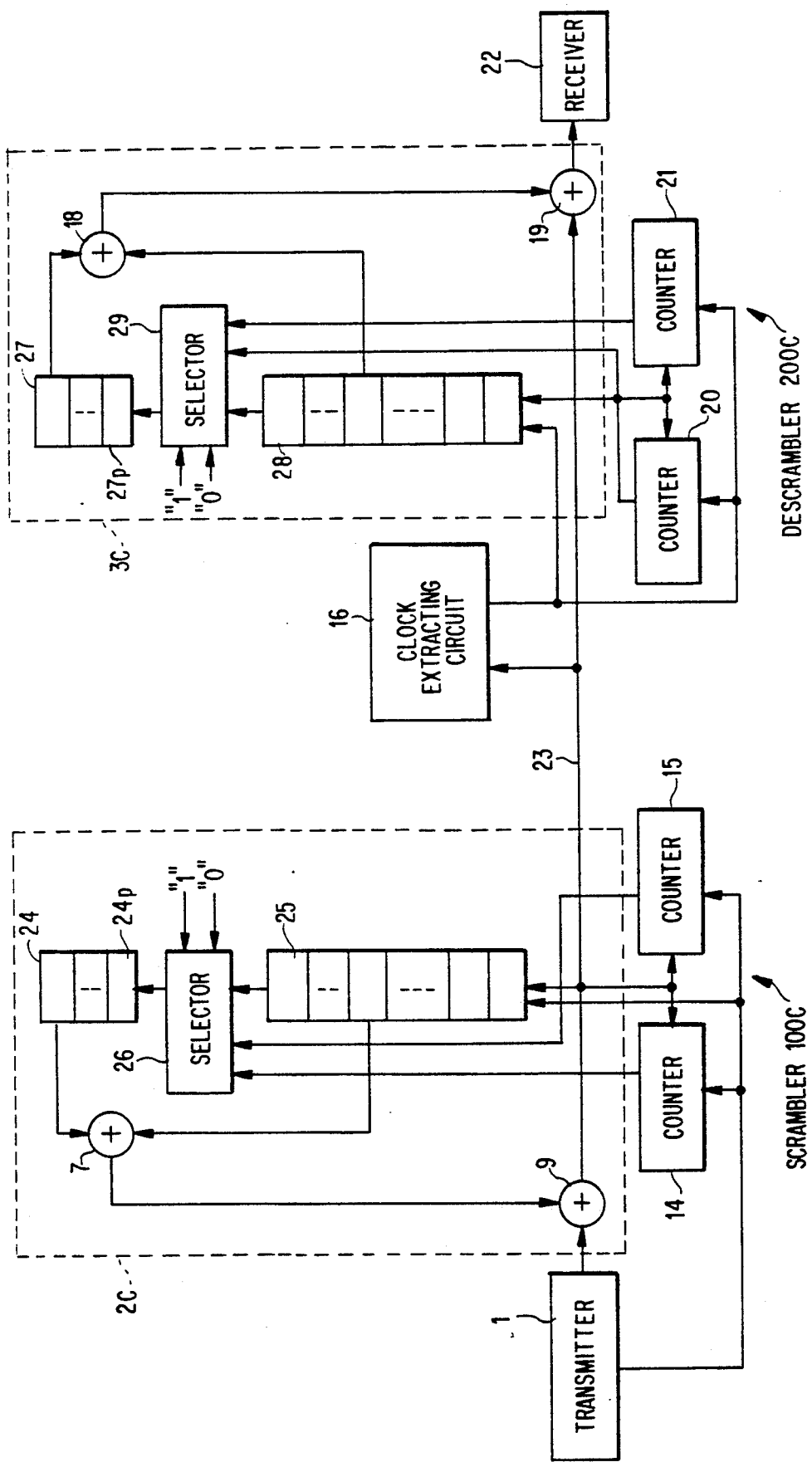

FIG. 4 is a block diagram illustrating a third preferred embodiment of the invention. The third preferred embodiment differs from the second in that its scrambling circuit 2C and descrambling circuit 3C have selectors 26 and 29, respectively. The selector 26 of the scrambler selects "1" and provides it to a register unit 24P upon detection by a counter 14 of the presence of consecutive "0" bits in the scrambled bit sequence, or feeds "0" to the register unit 24P in response to a detection signal from a counter 15 for consecutive "1" bits. Similarly, the selector 29 of the descrambler respectively gives a "1" or "0" bit to a shift register unit 27P in response to a detection signal from a counter 20 for consecutive "0" bits, or from a counter 21 for consecutive "1" bits.

The foregoing structure enables the third preferred embodiment of the invention to alter the contents of its relevant shift register units to "1" or "0" upon detection by its counter 14 or 15 of consecutive "0" or "1" bits, and to forcibly insert a "1" or "0" bit into the scrambled bit sequence via EXOR's 7 and 9, respectively.

What is claimed is:

1. A data scrambler for preventing consecutive appearance of the same symbols in a transmit data bit sequence, said scrambler comprising:
scrambling means for generating a scrambled bit sequence by scrambling said transmit data bit sequence;
monitor means for monitoring the presence of any two consecutive same symbols in said scrambled bit sequence and outputting a monitor signal, said monitor means further comprising a delay means for generating a delayed bit sequence by delaying said scrambled bit sequence by one bit, and an exclusive OR circuit for determining equivalence of the delayed bit sequence and said scrambled bit sequence;

counter means responsive to said monitor signal for counting transmit clock pulses and generating a control signal when a predetermined number of said transmit clock pulses have occurred; and inverter means responsive to the control signal from said counter means for inverting at least one bit of said scrambled bit sequence.

2. A data scrambler for preventing consecutive appearance of the same symbols in a transmit data bit sequence, said data scrambler comprising:

scrambler means, having a shift register comprising a plurality of register units, for generating a scrambled bit sequence by scrambling said transmit data bit sequence;

first counter means for counting a first predetermined number of consecutive bit zeros only in the scrambled bit sequence to produce a first control signal;

second counter means for counting a second predetermined number of consecutive bit ones only in the scrambled bit sequence to produce a second control signal; and inverter means responsive to said first and second control signals for inverting the content of a predetermined one among the plurality of register units of said shift register.

3. A data scrambler, as claimed in claim 2, wherein said inverter means comprises a selector.

4. A data descrambler for descrambling a scrambled bit sequence into a descrambled bit sequence to obtain an original transmit data sequence, comprising:

descrambling means having a shift register comprising a plurality of register units, for generating said descrambled bit sequence by descrambling said scrambling data bit sequence;

first counter means for counting a first predetermined number of consecutive bit zeros only in the scrambled bit sequence to produce a first control signal;

second counter means for counting a second, predetermined number of consecutive bit ones only in the scrambled bit sequence to produce a second control signal;

inverter means responsive to said first and second control signal for inverting the content of a predetermined one among the plurality of register units of said shift register.

5. A data descrambler as claimed in claim 4, wherein said inverter means comprises a selector.

6. A data scrambler for preventing a predetermined number of consecutive bits of a data sequence to be transmitted from having the same value, said data scrambler comprising:

(a) first means for counting a number of consecutive bits of said data sequence having the same value and providing a control signal when said number is equal to said predetermined number, said first means including:

(i) monitor means for providing a monitor signal when two consecutive bits of said data sequence have the same value;

(ii) counting means for counting transmit clock pulses and providing said control signal when the number of counted transmit clock pulses is equal to said predetermined number; and (iii) resetting means for resetting said transmit clock pulse counting means in response to said monitor signal, said monitor means further comprising a delay means for generating a delayed bit sequence by delaying a scrambled bit sequence by one bit, and an exclusive OR circuit for determining equivalence of the delayed bit sequence and said scrambled bit sequence; and (b) second means for inverting at least one bit of said data sequence in response to said control signal.

7. A data descrambler for descrambling a transmitted data sequence scrambled by a data scrambler as claimed in claim 6, said data descrambler comprising:

third means for counting a number of consecutive bits having the same value and providing a control signal when the number counted by the third means is equal to said predetermined number;

fourth means for inverting at least one bit of said transmitted data sequence in response to said control signal provided by said third means.

8. A data descrambler as claimed in claim 7, said third means comprising:

first counter means for counting a number of consecutive bits of said transmitted data sequence having a first value only and providing said control signal provided by said third means if said number of consecutive bits having said first value only is equal to a first predetermined number; and second counter means for counting a number of consecutive bits of said transmitted data sequence having a second value only and providing said control signal provided by said third means if said number of consecutive bits having said second value only is equal to a second predetermined number.

9. A data scrambler for preventing a predetermined number of consecutive bits of a data sequence to be transmitted from having the same value, said data scrambler comprising:

(a) first means for counting a number of consecutive bits of said data sequence having the same value and providing a control signal when said number is equal to said predetermined number, said first means further comprising:

(i) first counter means for counting a number of consecutive bits of said data sequence having a first value only and providing said control signal if said number of consecutive bits having said first value only is equal to a first predetermined number; and (ii) second counter means for counting a number of consecutive bits having a second value only and providing said control signal if said number of consecutive bits having said second value only if equal to a second predetermined number; and (b) second means comprising an exclusive-OR circuit responsive to said control signal and to one of said first value and second value for inverting at least one bit of said data sequence.

10. A data descrambler for descrambling a data sequence transmitted by a data scrambler, said data descrambler comprising:

(a) first means for counting a number of consecutive bits of said transmitted data sequence having the same value and providing a control signal when said number is equal to a predetermined number, said first means including:

(i) first counter means for counting a number of consecutive bits of said data sequence having a first value only and providing said control signal if said number of consecutive bits having said first value only is equal to a first predetermined number; and (ii) second counter means for counting a number of consecutive bits having a second value only and providing said control signal if said number of consecutive bits having said second value only is equal to a second predetermined number; and (b) second means comprising an exclusive-OR circuit responsive to said control signal and to one of said first value and second value for inverting at least one bit of said transmitted data sequence.

* * * * *

UNITED STATES PATENT AND TRADEMARK OFFICE
CERTIFICATE OF CORRECTION

PATENT NO. : 5,179,592
DATED : January 12, 1993
INVENTOR(S) : Toshihiko Kusano

It is certified that error appears in the above-indentified patent and that said Letters Patent is hereby corrected as shown below:

Col. 2, line 28, delete "1" and insert --n--.

Signed and Sealed this

Twenty-first Day of December, 1993

*Attest:*

BRUCE LEHMAN

*Attesting Officer*   Commissioner of Patents and Trademarks